Figure 1:
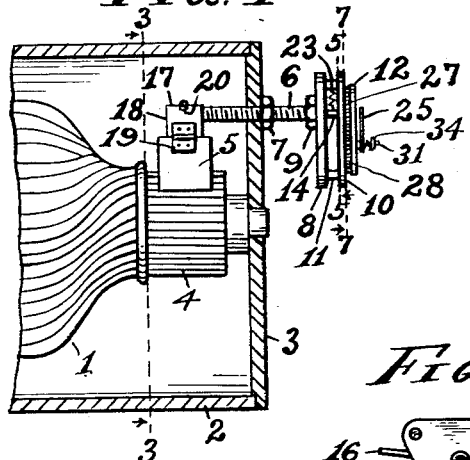

Aug. 1, 1933.  E. T. NAYLON  1,920,659

DEVICE FOR INDICATING WEAR OF BRUSHES

Filed June 29, 1932

Inventor

E. T. Naylon

By G. E. Dunstan his Attorney

Patented Aug. 1, 1933

1,920,659

UNITED STATES PATENT OFFICE 1,920,659

DEVICE FOR INDICATING WEAR OF BRUSHES

Elton T. Naylon, East Cleveland, Ohio

Application June 29, 1932. Serial No. 619,858

12 Claims. (Cl. 116—114)

This invention relates to devices for indicating wear of brushes of generators and other electrical machines which are enclosed and therefore make it difficult to examine the brushes.

The main object of the invention is to provide a device which may be attached to and form a part of a generator and will indicate the amount of the wearing away of the brushes without the necessity of removing the generator from the casing so that the brushes when worn badly may be replaced by new ones.

Another object of the invention is to provide a device of the above character, which is of simple construction, positive and accurate in operation without need of care, and easily applied to a generator or similar enclosed electrical machines for indicating outside of the casing the amount of wearing away of the brushes.

With the above and other objects in view, the invention will be hereinafter fully described as illustrated in the accompanying drawing, and the novel features thereof will be distinctly pointed out in the appended claims.

In the several views of the drawing similar characters of reference are used to indicate corresponding parts.

Figure 2:
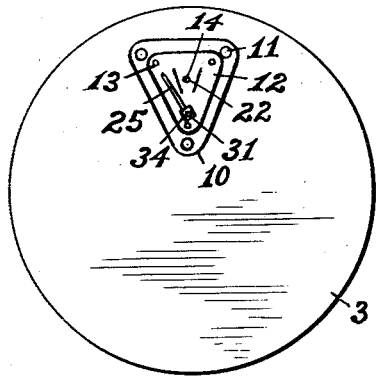
Figure 5:
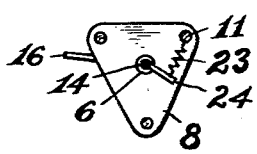
Figure 3:
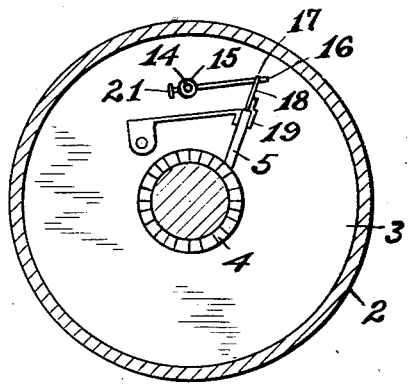
Figure 4:
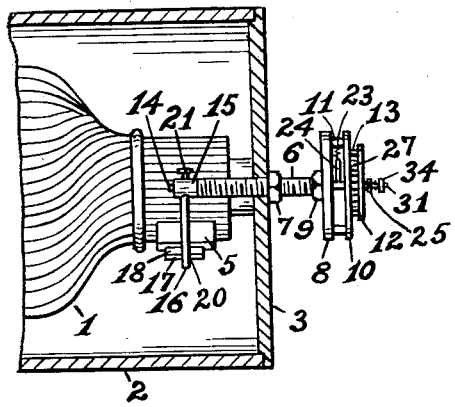
Figure 6:
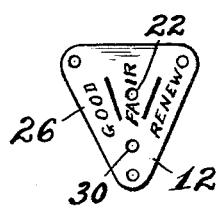
Figure 8:
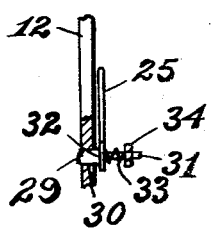
Figure 7:
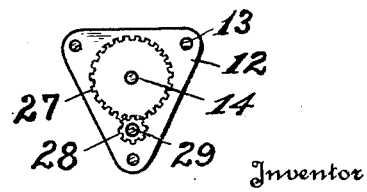

Figure 1 is a side elevation of a generator enclosed in a casing with a device for indicating wear of the brushes constructed in accordance with my invention applied thereto, the casing being broken away, Fig. 2 is an end view of Fig. 1, Fig. 3 is a cross sectional view taken on line 3—3 of Fig. 1, Fig. 4 is a plan view of Fig. 1, the casing being broken away, Fig. 5 is a cross sectional view of the indicating device taken on line 5—5 of Fig. 1, Fig. 6 is a face view, on an enlarged scale, of the top plate, Fig. 7 is a cross sectional view of the device, on an enlarged scale, taken on line 7—7 of Fig. 1, and Fig. 8 illustrates the means for adjustably holding the indicating hand on the shaft.

Referring to the drawing, 1 represents an electric generator such as used for automobiles and is usually enclosed in a cylindrical casing 2 having a removable head 3. The generator has a commutator 4 and spring supported brushes as 5 engaging same. Said brushes necessarily wear away and as they are enclosed can only be examined to ascertain their condition as to wear by first removing the generator from the casing. Due to the inconvenience and difficulty of removing the generator, the brushes are neglected and frequently not replaced before much inconvenience and often serious damage to the generator. My invention was designed to indicate upon convenient and ready examination the condition of the brushes as to wear in order that same may be replaced. This is accomplished by the following described device:

The indicating device consists of a tubular screw 6 passing through and threaded in the head 3 of the casing 2. A nut 7 on the tubular screw 6 serves to fix the screw in an adjusted set position in the head 3. To the outer end of the tubular screw 6 is fixed a triangular shaped supporting plate 8 by means of a lock-nut 9. The supporting plate 8 is preferably positioned with one edge horizontal and therefore one of its points extending downwardly. In spaced relation to the supporting plate 8 is a base plate 10 of the same size and form, which plates are fixed together at their corners by suitable pins indicated by 11. Arranged in spaced relation to the base plate 10 is an outer or top plate 12, which is also of triangular form though smaller than said base plate and is fixed thereto by corner pins indicated by 13.

Rotatably mounted in the tubular screw 6 is a rod or shaft 14, the inner end of which projects beyond said tubular screw and has fixed thereto a boss 15 carrying a laterally extending finger 16 which is at a right angle to said shaft. The outer or free end of the finger 16 is adapted to rest upon and engage the upper edge 17 of a piece of insulating material as 18 which is fixed by means of a clip 19 or in any suitable manner to the upper end of the brush 5. A transverse notch 20 is preferably provided in the center of the upper edge 17 of the insulating material 18 for receiving the finger 16. Said finger is adjustably fixed to the shaft 14 by a set-screw 21. The outer end of the shaft 14 passes through an opening in the base plate 10, across the space between said base plate and the outer plate 12 and is pivoted in said outer plate at 22. For tending to rotate the shaft 14 counter-clockwise and thereby hold the finger 16 in slight pressing engagement with the piece of insulating material 18 so that said finger will move in the arc of a circle as the brush 5 wears away, a coiled spring 23 extends from one of the upper pins 11 to a cross-arm 24 which is fixed to the shaft 14 between the plates 8 and 10. For indicating whether the brush 5 is in good or fair condition as to being worn away or should be renewed, an indicating hand 25 is moved laterally in the arc of a circle across the top plate 12 by said action of the shaft 14, and said top plate is divided into spaces and so marked as shown at 26. In order that the hand 25 will swing laterally in proper relation to the downward movement of the finger 16, a suitable gear 27 is fixed to the shaft 14 between the plates 10 and 12, and said gear meshes with and drives a pinion 28 fixed to a stub-shaft 29, which is pivoted in said plates as at 30. The indicating hand 25 is carried by the outer projecting and reduced end 31 of the pinion shaft 29, and is held on said shaft so as to be rotated thereby but is also rotatably adjustable relative thereto by being held between the shoulder 32 of said pinion shaft and a coiled spring 33 to which proper tension is applied by a nut 34.

This indicating device is readily applied to an enclosed generator by simply drilling and tapping a hole in the head thereof for the tubular screw 6. When the brush 5 is new, the finger 16 rests lightly upon the piece of insulating material 18 and is in its highest position. The indicating hand 25 is adjusted on the stub or pinion shaft 29 so as to be at its extreme left-hand position over the spacing of the top plate 12 marked Good. As the brush 5 wears away, the finger 16 gradually swings counter-clockwise and this movement rotates the shaft 14 thereby causing the gear 27 to drive the pinion 28 and thus move the hand 25 clockwise. When the brush 5 has worn sufficiently away, the hand 25 will have moved over the space marked Fair and later over Renew, and said hand thus indicates the condition of the brush as to wear. By occasionally observing the position of the indicating hand 25 it is possible to know the condition of the brush, without the necessity of removing the generator from its casing.

From the drawing and description, it is readily seen that by the use of this device, the wearing away of the brushes of generators and other electrical machines which are enclosed will be indicated outside of the casing and by convenient observation the condition of the brushes will be known in order that same may be replaced before severe damage results from worn out brushes.

Although the construction disclosed and illustrated is well adapted for carrying out the purpose of the invention, it is to be understood that slight changes in the details of construction are easily possible and may be made within the scope of the claims.

Having fully described my invention, what I claim is:

1. In an indicating device for brushes, the combination with a brush of a pivotally supported means adapted to move as the brush wears away, and means actuated by the first mentioned means for indicating the movement thereof.

2. In an indicating device for brushes, the combination with a brush of a finger, the finger being pivotally supported and adapted to move as the brush wears away, and means actuated by the finger for indicating the movement of said finger.

3. In an indicating device for brushes, the combination with a brush of a finger adapted to swing as the brush wears away, a shaft, the shaft being moved by said finger, and a hand moved by said shaft for indicating the amount of wearing away of the brush.

4. In an indicating device for brushes, the combination with a brush of a finger, the finger resting upon the brush, a shaft, the finger being fixed to the shaft, the shaft being movably supported, means tending to cause movement of said shaft to cause said finger to move as the brush wears away, and indicating means actuated by said shaft.

5. In an indicating device for brushes, the combination with a brush of a finger, the finger resting upon the brush, a shaft, the finger being fixed to the shaft, the shaft being movably supported, means tending to cause movement of said shaft to cause said finger to move as the brush wears away, a plate, the plate having markings, and a hand actuated by said shaft and swung over said plate for indicating the amount of wearing away of the brush.

6. In an indicating device for brushes, the combination with a brush enclosed from view of means adapted to move as the brush wears away, means extending from within to the outside of said closure and actuated by said first mentioned means, and means outside of said closure actuated by said second mentioned means for indicating the amount of wearing away of the brush.

7. In an indicating device for brushes, the combination with a brush enclosed from view in a casing, a shaft extending from within to the outside of said casing, means extending from the shaft adapted to move as the brush wears away and actuating said shaft, and means outside of said casing actuated by said shaft for indicating the amount of wearing away of said brush.

8. In an indicating device for brushes, the combination with a brush enclosed from view in a casing, a shaft extending from within to the outside of said casing, a finger fixed to said shaft adapted to move as the brush wears away for actuating said shaft, and indicating means outside of said casing actuated by said shaft for showing the wearing away of said brush.

9. In an indicating device for brushes, the combination with a brush enclosed from view in a casing, a shaft extending from within to the outside of said casing, a finger fixed to said shaft adapted to move as the brush wears away from actuating said shaft, a gear fixed to the projecting end of said shaft, a pinion driven by said gear, and a hand actuated by said pinion for indicating the wearing away of said brush.

10. In an indicating device for brushes, the combination with a brush enclosed from view in a casing, a tubular screw extending from the casing, a shaft rotatably mounted in the tubular screw, a finger extending laterally from the inner end of said shaft, the finger resting upon said brush, means tending to rotate said shaft to cause said finger to follow said brush as it wears away, an indicating means actuated by the outer end of said shaft.

11. In an indicating device for brushes, the combination with a brush enclosed from view in a casing, a tubular screw extending from the casing, a shaft rotatably mounted in the tubular screw, a finger extending laterally from the inner end of said shaft, the finger resting upon said brush, means tending to rotate said shaft to cause said finger to follow said brush as it wears away, a hand actuated by the outer end of said shaft, and means permitting adjustment of said hand relative to said rotation of said shaft.

12. In an indicating device for brushes, the combination with a brush enclosed from view in a casing, a tubular screw extending from the casing, a shaft rotatably mounted in the tubular screw, a finger extending laterally from the inner end of said shaft, the finger resting upon said brush, means tending to rotate said shaft to cause said finger to follow said brush as it wears away, a gear fixed to the outer end of said shaft, a pinion driven by said gear, the pinion having a stub-shaft, a hand supported by the stub-shaft, and means for permitting rotatable adjustment of said hand relative to said stub-shaft.

ELTON T. NAYLON.